United States Patent [19]

Schmidt et al.

[11] Patent Number: 4,582,893

[45] Date of Patent: Apr. 15, 1986

[54] AROMATIC POLYESTERS WHICH CONTAIN TERMINAL OR LATERAL RADICALS WITH TWO CONJUGATED DOUBLE BONDS

[75] Inventors: Manfred Schmidt; Wolfgang Stix; Ludwig Bottenbruch, all of Krefeld, Fed. Rep. of Germany

[73] Assignee: Bayer Aktiengesellschaft, Leverkusen, Fed. Rep. of Germany

[21] Appl. No.: 581,879

[22] Filed: Feb. 21, 1984

[30] Foreign Application Priority Data

Mar. 5, 1983 [DE] Fed. Rep. of Germany ....... 3307908

[51] Int. Cl.⁴ ............................................ C08G 63/18
[52] U.S. Cl. .................... 528/176; 528/125; 528/126; 528/128; 528/173; 528/179; 528/190; 528/192; 528/193; 528/194; 528/191
[58] Field of Search .............. 528/176, 179, 192, 125, 528/126, 128, 190, 191, 193, 194, 173

[56] References Cited

U.S. PATENT DOCUMENTS 3,600,357 8/1971 Stewart et al. ...................... 528/192
4,230,817 10/1980 Charbonneau ...................... 528/192

Primary Examiner—Lester L. Lee
Attorney, Agent, or Firm—Connolly & Hutz

[57] ABSTRACT

Aromatic polyesters based on diphenols, iso- and terephthalic acid, which contain terminal or lateral radicals with two conjugated double bonds, show greatly improved resistance to stress corrosion after tempering.

19 Claims, No Drawings

AROMATIC POLYESTERS WHICH CONTAIN TERMINAL OR LATERAL RADICALS WITH TWO CONJUGATED DOUBLE BONDS

This invention relates to thermoplastic, aromatic polyesters of which the molecular weight has been regulated with special chain terminators, to a process for their production and to the use of these polyesters for the production of injection-moulded articles, films and coatings.

Aromatic polyesters are known (W. M. Eareckson, J. Polym. Sci. XL, 399–406 (1959); Andre Conix, "Thermoplastic Polyesters from Bisphenols", Ind. Eng. Chem., Vol. 51, No. 2, 147–150, February 1959; French Pat. No. 1,177,517, U.S. Pat. No. 3,351,624 and DE-AS No. 14 45 384). By virtue of their excellent properties, they are used for any applications requiring a high melting point and a high glass transition temperature, high dimensional stability under heat and high impact and notched impact strength.

Although known aromatic polyesters are satisfactory in many respects, there is a keenness among experts further to improve the properties of these polyesters. In particular, a greater resistance to stress corrosion is desirable in many cases.

It has now surprisingly been found that aromatic polyesters containing special radicals show the required combination of favorable properties after tempering.

The present invention relates to thermoplastic, aromatic polyesters based on diphenols, terephthalic and isophthalic acid (acid ratio 7:3 to 3:7), chain terminators and, optionally, branching agents, characterised in that the aromatic polyesters contain, per mole of diphenol radicals, from 0.01 to 0.1 and preferably from 0.02 to 0.06 mole of terminal or lateral radicals corresponding to the following formula:

$$-CH=CH-CH=CH-R$$

in which R represents a $C_1$–$C_8$-alkyl radical, preferably methyl, or a $C_6$–$C_{20}$-hydrocarbon radical containing at least one aromatic ring, preferably phenyl.

The present invention also relates to a process for producing these aromatic polyesters by known phase interface or homogeneous phase methods, characterised in that at least one compound corresponding to the following formula:

$$A-C=CH-CH=CH-R \qquad (I)$$

in which

R is as defined above, and

A represents a monofunctional radical which acts as a reactive part of compound I in the production of the polyesters by the two-phase interface process or by the homogeneous phase process, is used as the chain terminator.

The present invention also relates to the use of these aromatic polyesters for the production of injection-moulded articles, films and coatings.

Preferred diphenols for the production of the polyesters according to the invention are compounds corresponding to the following formula:

$$HO-Z-OH \qquad (II)$$

in which Z represents a difunctional, mononuclear or polynuclear aromatic radical containing from 6 to 30 carbon atoms, the structure of Z being such that the two OH-groups are each directly attached to a C-atom of an aromatic system.

Particularly preferred diphenols are compounds corresponding to the following formula:

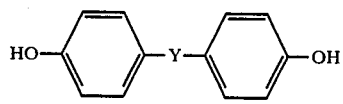

in which Y is a single bond, an alkylene or alkylidene radical containing from 1 to 7 carbon atoms, a cycloalkylene or cycloalkylidene radical containing from 5 to 12 carbon atoms, —O—, —S—,

—SO$_2$— or

and also their nucleus-alkylated and nucleus-halogenated derivatives, for example hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones and α,α'-bis-(hydroxyphenyl)-diisopropylbenzenes, as well as their nucleus-alkylated and nucleus-halogenated compounds. These and other suitable diphenols are described, for example, in U.S. Pat. Nos. 3,028,365; 3,275,601; 3,148,172; 3,062,781; 2,991,273; 3,271,367; 2,999,835; 2,970,131 and 2,999,846, in German Offenlegungsschrifts Nos. 15 70 703, 20 63 050, 20 63 052, 22 11 956 and 22 11 957, in French Pat. No. 1,561,518 and in the book by H. Schnell entitled "Chemistry and Physics of Polycarbonates", Interscience Publishers, New York, 1964.

The most important diphenols are mentioned by name in the following:

Bisphenol A, tetramethyl bisphenol A, 1,1-bis-(4-hydroxyphenyl)-isobutane, 1,1-bis-(4-hydroxyphenyl)-cyclohexane, 4,4'-dihydroxydiphenylsulphide, 4,4'-dihydroxydiphenyl, 4,4'-dihydroxydiphenylsulphone and their di- and tetra-halogenated derivatives. Bisphenol A is particularly preferred. Mixtures of the above-mentioned diphenols may also be used.

Mixtures of terephthalic acid and isophthalic acid components in a molar ratio of from 7:3 to 3:7 are used for producing the aromatic polyesters according to the invention, mixtures in a molar ratio of 1:1 being preferred.

The compounds corresponding to formula (I) are known.

Compounds of formula (I) which may be used in accordance with the invention are preferably those in which A represents —CH$_2$OR$^1$ or

$R^1$ represents a hydrogen atom or

$R^2$ represents —Cl or —O—Z—$R^3$,
$R^3$ represents —OH, —COCl or —OCOCl and
Z is as defined above.

Compounds of formula (I) which are particularly preferred for use in accordance with the invention are, for example, sorbic acid chloride, sorbic acid alcohol, the chlorocarbonic acid esters or sorbic alcohol, hydroquinone monosorbic acid ester, 2,2-bis-(4-hydroxyphenyl)-propane monosorbic acid ester, the acid chloride or sorbic acid-p-hydroxybenzoic acid ester and the acid chloride of isophthalic or terephthalic/sorbic alcohol semiester.

Suitable branching agents are, for example, trifunctional or higher carboxylic acid chlorides, such as trimesic acid trichloride, cyanuric acid trichloride, 3,3',4,4'-benzophenone tetracarboxylic acid tetrachloride, 1,4,5,8-naphthalene tetracarboxylic acid tetrachloride or pyromellitic acid tetrachloride used generally in quantities of from 0.01 to 1.0 mole percent (based on the dicarboxylic acid dichlorides used), or trifunctional or higher phenols, such as phloroglucinol, 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methyl phenol, 2-(4-hydroxyphenyl)-2-(2,4-dihydroxyphenyl)-propane, tetra-(4-[4-hydroxyphenylisopropyl]-phenoxy)-methane, 1,4-bis-[(4,4''-dihydroxytriphenyl)-methyl]-benzene generally in quantities of from 0.01 to 1.0 mole percent (based on the diphenols used). Phenolic branching agents may be introduced first with the diphenols whilst acid chloride branching agents may be introduced together with the acid dichlorides.

By virtue of the conjugated double bonds, the aromatic polyesters according to the invention, when heated to temperatures in the range of from 90° to 240° C. and more particularly in the range of from 100° to 220° C., usually enter into a reaction which leads to a higher molecular weight, the increase in molecular weight depending upon the temperature level and upon the duration of the heat treatment. Branched polyesters may give crosslinked, insoluble products. This should be borne in mind when processing is carried out in kneaders, extruders, presses or injection moulding machines.

The possibility of increasing the molecular weight may also be used to make the polyesters easier to process. Thus, mouldings may be produced for example from a lower molecular weight polyester than usual and subsequently tempered, resulting in a higher molecular weight which in turn means improved properties.

If the above-described increase in molecular weight at elevated temperature is not wanted, it is advisable to keep the number of —CH=CH—CH=CH—R-groups low, optionally by using standard chain terminators, such as for example phenols, aromatic or saturated aliphatic monocarboxylic acid halides, sulphonic acid chlorides or chlorocarbonic acid esters, preferably phenol, p-tert.-butyl phenol, 2,6-dimethylphenol, p-isooctylphenol, benzoyl chloride, benzosulphochloride, or phenyl chlorocarbonic acid esters. If both standard chain terminators and chain terminators corresponding to formula (I) are used, the total quantity of chain terminator should generally amount to from 0.04 to 0.15 mole per mole of diphenol.

The aromatic polyesters according to the invention may be produced by the phase interface process (cf DE-OS No. 29 40 024 or U.S. Pat. No. 3,216,970) or by the homogeneous phase solution process—generally known as the "pyridine process"—(cf U.S. Pat. No. 3,234,168, DE-AS No. 15 95 822, DE-OS No. 23 31 245).

The aromatic polyesters according to the invention have relative viscosities of generally from 1.1 to 2.5 and, more particularly, from 1.2 to 1.5 (as measured on a 0.5% by weight solution in dichloromethane at 25° C.).

They may contain stabilisers, such as for example oxidation inhibitors, UV-stabilisers, flow promoters and mould-release agents or other additives and also fillers, such as glass fibres, glass beads, asbestos or carbon fibres, kieselguhr, kaolin, mineral fibres, stone powder and pigments.

In the following Examples, the relative viscosity $\eta_{rel}$ was measured on a 0.5% by weight solution in dichloromethane at 25° C.

EXAMPLES

Example 1

3.22 g (10 mMoles) of tetra-n-butyl ammonium bromide and 3550 g of dichloromethane were added to a solution of 236.44 g (1.037 moles) of bisphenol A and 83.8 g (2.095 moles) of sodium hydroxide in 4.56 liters of distilled water. A solution of 190.82 g (0.94 mole) of an equimolar mixture of iso- and terephthalic acid dichloride and 7.92 g (61 mMoles) of sorbic acid chloride in 286 g of dichloromethane was stirred into the resulting mixture over a period of 5 minutes at 20° to 25° C. The mixture was then stirred for another 20 minutes at a pH-value of from 12 to 13, the temperature being kept at 25° C. The organic phase was then separated off and washed with 5% by weight aqueous phosphoric acid and with water. The dried organic phase was concentrated to one third of its volume in a rotary evaporator (bath temperature 35° C.) and the aromatic polyester was precipitated with petroleum ether, separated off and dried in vacuo at 25° C. The aromatic polyester obtained had a relative viscosity $\eta_{rel}$ of 1.241.

Example 2

The procedure was as in Example 1 using the following starting materials: 189.24 g (0.83 mole) of bisphenol A, 67.04 g (1.676 moles) of sodium hydroxide, 2.576 (8 mMoles) of tetra-n-butylammonium bromide, 3648 ml of water, 2800 g of dichloromethane, 159.15 g (0.784 mole) of terephthalic/isophthalic acid dichloride, 4176 g (32 mMoles) of sorbic acid chloride and 940 g of dichloromethane.

An aromatic polyester having a relative viscosity $\eta_{rel}$ of 1.351 was obtained.

Example 3

The procedure was as in Example 1 using the following starting materials: 189.24 g (0.83 mole) of bisphenol A, 67.04 g (1.676 moles) of sodium hydroxide, 2.576 g (8 mMoles) of tetra-n-butylammonium bromide, 3648 ml of water, 157.93 g (0.778 mole) of terephthalic/isophthalic acid dichloride, 1.062 g (4 mMoles) of trimesic acid trichloride, 4.176 g (32 mMoles) of sorbic acid chloride and 940 g of dichloromethane. The aromatic polyester obtained had a relative viscosity $\eta_{rel}$ of 1.422.

This product was tempered for 10 minutes at 280° C. Films were cast from the tempered material and from the starting material (untempered).

The films obtained were stretched over a glass rod immersed in a mixture of toluene and isooctane (1:1 parts by weight) and the two sides were each pulled obliquely upwards under a weight of 100 g.

It was found that the film of the tempered material tore after a much longer time than the film of the untempered end product.

We claim:

1. A thermoplastic aromatic polyester comprising, reaction radicals formed by the reaction of a diphenol, a terephthalic acid, an isophthalic acid and a chain terminator, where the molar ratio of terephthalic acid reaction radicals to isophthalic acid reaction radicals is from 7:3 to 3:7, and where the chain terminator reaction radicals correspond to $$A'-CH=CH-CH=CH-R,$$

where A' is —OCH$_2$— or

R is an alkyl radical containing from one to eight carbon atoms or a hydrocarbon radical containing from six to twenty carbon atoms and at least one aromatic ring, and the polyester contains from 0.01 to 0.1 mole of terminal radicals per mole of diphenol reaction radicals.

2. A polyester as claimed in claim 1, wherein the polyester contains from 0.02 to 0.06 mole of the terminal reaction radicals, per mole of diphenol reaction radicals.

3. A polyester as claimed in claim 1, further comprising branching agent reaction radicals formed during the reaction of a branching agent with the diphenol, terephthalic acid, isophthalic acid and chain terminator.

4. A polyester as claimed in claim 3, wherein the branching agent is selected from trifunctional or higher carboxylic acid chlorides and trifunctional or higher phenols.

5. A polyester as claimed in claim 3, wherein the branching agent is selected from trimesic acid trichloride, cyanuric acid trichloride, 3,3',4,4'-benzophenone tetracarboxylic acid tetrachloride, 1,4,5,8-napthalene tetracarboxylic acid tetrachloride, pyromellitic acid tetrachloride, phloroglucinol, 4,6-dimethyl-2,4,6-tri-(4-hydroxyphenyl)-2-heptene, 4,6-dimethyl-2,4,6-tri-(4-hydroxyphenyl)-heptene, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methyl phenol, 2-(4-hydroxyphenyl)-2-(2,4-dihydroxyphenyl)-propane, tetra-(4-[4-hydroxyphenylisopropyl]-phenoxy)-methane and 1,4-bis-[4,4''-(dihydroxytriphenyl)-methyl]-benzene.

6. A polyester as claimed in claim 1, wherein R is methyl or phenyl.

7. A polyester as claimed in claim 3, wherein R is methyl or phenyl.

8. A polyester as claimed in claim 1, wherein R is methyl.

9. A polyester as claimed in claim 3, wherein R is methyl.

10. A polyester as claimed in claim 1, further comprising the polyester has a relative viscosity of from 1.1 to 2.5 as measured on a 0.5 percent, by weight, solution in dichloromethane at 25° C.

11. A polyester as claimed in claim 3, further comprising the polyester has a relative viscosity of from 1.1 to 2.5 as measured on a 0.5 percent, by weight, solution in dichloromethane at 25° C.

12. A polyester as claimed in claim 2, further comprising a branching agent.

13. A polyester as claimed in claim 2, wherein the branching agent is selected from trifunctional or higher carboxylic acid chlorides and trifunctional or higher phenols.

14. A polyester as claimed in claim 2, wherein R is methyl or phenyl.

15. A polyester as claimed in claim 12, wherein R is methyl.

16. A polyester as claimed in claim 2, further comprising the polyester has a relative viscosity of from 1.1 to 2.5 as measured on a 0.5 percent, by weight, solution in dichloromethane at 25° C.

17. A polyester as claimed in claim 4, wherein R is methyl or phenyl.

18. A polyester as claimed in claim 4, wherein R is methyl.

19. A polyester as claimed in claim 4, further comprising the polyester has a relative viscosity of from 1.1 to 2.5 as measured on a 0.5 percent, by weight, solution in dichloromethane at 25° C.